(12) United States Patent
Bourdeaut

(10) Patent No.: US 8,483,733 B2
(45) Date of Patent: Jul. 9, 2013

(54) DEVICE FOR ADAPTING MODULATION AND CODING SCHEMES TO BE APPLIED TO DATA INTENDED TO BE BROADCAST TO RADIO COMMUNICATION TERMINALS

(75) Inventor: Stanislas Bourdeaut, Velizy (FR)

(73) Assignee: Alcatel Lucent, Paris (FR)

( * ) Notice: Subject to any disclaimer, the term of this patent is extended or adjusted under 35 U.S.C. 154(b) by 720 days.

(21) Appl. No.: 12/377,638

(22) PCT Filed: Jul. 20, 2007

(86) PCT No.: PCT/EP2007/057545
§ 371 (c)(1),
(2), (4) Date: May 18, 2010

(87) PCT Pub. No.: WO2008/022860
PCT Pub. Date: Feb. 28, 2008

(65) Prior Publication Data
US 2010/0285826 A1    Nov. 11, 2010

(30) Foreign Application Priority Data

Aug. 17, 2006   (FR) ...................................... 06 53387

(51) Int. Cl.
*H04B 15/00*    (2006.01)
(52) U.S. Cl.
USPC ......................................... 455/503; 455/3.02
(58) Field of Classification Search
USPC ................... 455/3.01, 3.02, 503, 515, 452.2, 455/135, 161.3, 277.2; 348/462, 731, E07.001
See application file for complete search history.

(56) References Cited

U.S. PATENT DOCUMENTS

| | | | | |
|---|---|---|---|---|
| 2,905,747 | A * | 9/1959 | Kidd et al. | 380/238 |
| 5,946,045 | A * | 8/1999 | Ozkan et al. | 725/54 |
| 6,532,258 | B1 * | 3/2003 | Goldston et al. | 375/227 |
| 6,542,736 | B1 * | 4/2003 | Parkvall et al. | 455/452.2 |
| 6,856,604 | B2 * | 2/2005 | Lundby | 370/312 |
| 7,356,094 | B1 * | 4/2008 | Ikeda et al. | 375/316 |
| 7,587,219 | B2 * | 9/2009 | Bottomley et al. | 455/522 |
| 7,630,339 | B2 * | 12/2009 | Laroia et al. | 370/330 |
| 8,098,607 | B2 * | 1/2012 | Lundby | 370/312 |
| 2002/0003798 | A1 * | 1/2002 | Sato et al. | 370/390 |
| 2002/0144266 | A1 * | 10/2002 | Goldman et al. | 725/46 |

(Continued)

FOREIGN PATENT DOCUMENTS

EP        1 406 406 A1    4/2004

OTHER PUBLICATIONS

Siemens, "Measurement Requirements and MBMS Reception in Cell-FACH State," 3GPP TSG RAN WG4 (Radio) Meeting #32, XX, XX, XP002362098, 5 pages, Aug. 16-20, 2004.

(Continued)

*Primary Examiner* — Dominic E Rego
(74) *Attorney, Agent, or Firm* — Fay Sharpe LLP

(57) ABSTRACT

A device is dedicated to adapting modulation and coding schemes to be applied to data intended to be broadcast by means of a dedicated carrier over a forward channel of a radio communication network to radio terminals (UE) connected to at least that radio communication network. This device (D) comprises processing means (PM) tasked with adapting at least one modulation and coding scheme to be applied to data intended to be broadcast by means of the dedicated carrier, based on actual radio broadcast conditions, over links established between the radio network and radio terminals (UE) which are recipients of the data to be broadcast.

18 Claims, 1 Drawing Sheet

U.S. PATENT DOCUMENTS

| | | |
|---|---|---|
| 2003/0112778 A1 | 6/2003 | Lundby |
| 2003/0207696 A1 | 11/2003 | Willenegger |
| 2005/0002330 A1 | 1/2005 | Cave et al. |
| 2005/0113099 A1 | 5/2005 | Eriksson et al. |
| 2005/0270969 A1* | 12/2005 | Han et al. ............... 370/210 |
| 2006/0013168 A1* | 1/2006 | Agrawal et al. ............. 370/335 |
| 2008/0025266 A1* | 1/2008 | Tynderfeldt et al. ......... 370/337 |
| 2008/0063116 A1* | 3/2008 | Yokoyama .................. 375/299 |

OTHER PUBLICATIONS

International Search Report for Appl. No. PCT/EP2007/057545 dated Nov. 28, 2007.

* cited by examiner

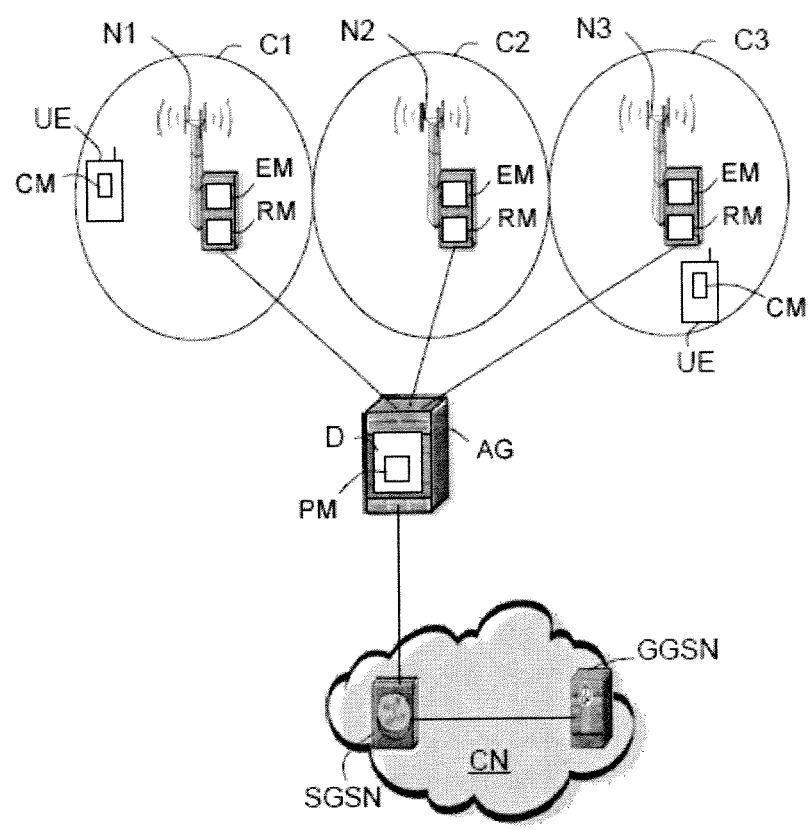

DEVICE FOR ADAPTING MODULATION AND CODING SCHEMES TO BE APPLIED TO DATA INTENDED TO BE BROADCAST TO RADIO COMMUNICATION TERMINALS

The invention pertains to radio communication networks having a first frequency band or first time slots for broadcasting data to radio communication terminals, in waves and by means of a carrier dedicated to a broadcast service, over a so-called forward channel.

Here, "radio communication network" refers to any type of network having access to a radio access network capable of broadcasting data. In particular, it may be a satellite network, such as an SDMB network (for "Satellite Digital Multimedia Broadcast"), or a terrestrial radio network, such as a UMTS network capable of broadcasting (for example, an MBMS (for "Multimedia Broadcast/Multicast Services") network), or its evolution known as LTE ("Long Term Evolution"), or GPRS, or DVB-H (for "Digital Video Broadcasting-Handheld"—used for mobile television), or a hybrid network, i.e. one which is both satellite-based and terrestrial.

Furthermore, the term "forward channel" here refers to the channel used to broadcast data from the network to radio (communication) terminals (also called a "downlink" when speaking of a terrestrial network), and the term "backward channel" refers to the channel that allows radio terminals to transmit data to the network (also called an "uplink" when speaking of a terrestrial network).

Furthermore, the term "radio communication terminal" here refers to any fixed or mobile (or portable, or cellular) communication device capable of exchanging data in wave form with another device, via a radio access network. Consequently, it may, for example, be a fixed or mobile (or cellular) telephone, a desktop or laptop computer, or a personal digital assistant (or PDA), no long as it is equipped with radio communication means, which may potentially be satellite-based, that are capable of receiving broadcast data.

Additionally, the term "broadcast service" here refers to any unidirectional point-to-multipoint multimedia content broadcast service, and particularly the MBMS broadcast service, the SDMB broadcast service, the DVB-H broadcast service, including its variant adapted to satellite-based networks, and the broadcast service proposed in the evolution of UMTS known as LTE ("Long Term Evolution") and in the as GSM/GPRS (MBMS/GPRS) or WBCDMA networks. As a reminder, the MBMS broadcast service is defined in the sixth version of the 3GPP (3rd Generation Partnership Project) specifications, which governs the transmission of multimedia data in mobile (or cellular) networks, such as UMTS or EDGE networks, and in particular in the 3GPP technical specifications TS 25.346 and 23.246 (which are accessible on the 3GPP website at the address "ftp.3gpp.org").

Finally, the term "multimedia content" here refers to data files, voice, audio files, or videos, in particular.

As is known to a person skilled in the art, in some of the aforementioned types of networks, and particularly in the LTE evolution of UMTS, it is possible to adapt, within the radio access network (or RAN), depending on the radio conditions, the modulating and coding scheme(s) to be applied to the data that must be broadcast to certain radio terminals on the forward channel, by means of a dedicated carrier (for example, the MBMS carrier).

This adaptation may, for example, be done based on measurement reports transmitted by the radio terminals on the forward channel. For example, the radio terminals are configured to transmit the measurement of the block error rate (or BLER), which represents the percentage of data blocks lost (i.e. not received) compared to the data blocks transmitted by the network on the forward channel's broadcast channel.

In a dedicated-carrier broadcast environment, such as MBMS, the MBMS cells offer neither PCH ("Paging CHannel") downlink bearers for transmitting paging indicators about idle mode conditions nor uplink access channels used for requesting authorization to transmit within a cell. Consequently, the radio terminals must obtain the paging information and/or take radio measurements regarding the radio reception conditions in other cells or on frequencies other than those of MBMS, or obtain them from radio access technologies other than the one used by the MBMS broadcast services. However, when a radio terminal does not have enough reception channels to simultaneously receive broadcast MBMS data and paging information, or in order to receive broadcast MBMS data (and potentially paging information as well) and simultaneously carry out radio measurements, it is forced to successively tune its reception to different carriers, including the dedicated carrier (MBMS). These successive tunings are carried out in cycles that may be identical for all radio terminals connected to a given radio network, or one which may vary from one radio terminal to another, depending on their respective needs and/or their identity (IMSI) and/or their capacities. These cycles are sometimes called "DRX cycles" ("Discontinuous Reception").

As a result of these cycles, every time a mobile terminal is tuned to a different carrier than the dedicated carrier (MBMS), it cannot receive the data that is broadcast. Consequently, after each tuning to a carrier different from the one that is dedicated to the broadcast service, a radio terminal generates a BLER measurement that may indicate a very large number of non-received blocks. These BLER measurements are therefore biased, and are not representative of actual (i.e. real) radio conditions on the MBMS-dedicated frequency. As a result, the radio access network carries out a data modulation and coding scheme adaptation, based on biased measurements, which is not optimal and may indeed prove harmful.

Furthermore, the radio terminals may undergo other restrictions than radio conditions, which are not currently taken into account.

The purpose of the invention is therefore to improve the situation.

To that end, it discloses a device dedicated to adapting modulation and coding schemes to be applied to data intended to be broadcast by means of a dedicated carrier, on the forward channel of a radio communication network, to radio (communication) terminals connected to at least that radio communication network.

The forward channel (and the backward channel, which will be dealt with later) respectively correspond to first and second distinct frequency bands (for FDD ("Frequency Division Duplex") transmission mode), or to distinct time slots or sets of time slots (for example, when using TDD ("Time Division Duplex") transmission mode, which consists in using a single carrier divided into time slots selectively assigned to the forward and backward channels).

This adaptation device is characterized by the fact that it comprises processing means tasked with adapting at least one data modulation and coding scheme (for data to be broadcast over the dedicated carrier) based on actual radio broadcast conditions over links established between the radio network and radio terminals which are the recipients of the data to be broadcast.

The device of the invention may comprise other characteristics, which may be taken separately or in combination, in particular:

in a first embodiment, the processing means may be tasked with determining the actual radio broadcast conditions based on measurements that are transmitted by at least some of the radio terminals (which are recipients of the data to be broadcast), and which are representative of the quality of at least one radio reception channel of these radio terminals (recipients of the data to be broadcast):
at least some of the measurements may be radio reception channel quality indicators (or CQI);
its processing means may be tasked with adapting each data modulation and coding scheme (for data to be broadcast over the dedicated carrier) based on the worst or best radio reception channel quality indicator, or based on the mean of the radio reception channel quality indicators. In the latter situation, the processing means may be tasked with weighting the measurements (indicators) that are involved in the mean based on at least one radio parameter, such as the power used by a radio terminal to transmit its measurements over a radio channel of the broadcast backward channel;

in a second embodiment, the processing means may be tasked with determining the actual radio broadcast conditions based both on block error rate (or BLER) measurements transmitted by at least some of the radio terminals (which are recipients of the data to be broadcast); and on restrictions to which at least some of these radio terminals (which are recipients of the data to be broadcast) are subject, that are not dependent on radio broadcast conditions;
the restrictions may, for example, be representative of the cycles during which the radio terminals are required to successively tune their reception to different carriers, including the dedicated carrier;
the cycles pertain to the dedicated carrier and at least one other carrier, selected, for example, from among a carrier used for paging and a carrier used to take measurements representative of the quality of at least one radio reception channel of a radio terminal;
at least some of the restrictions may be transmitted to the device by at least some of the radio terminals over the broadcast backward channel, without requiring systematic acknowledgment over the broadcast forward channel. Here, the phrase "without requiring systematic acknowledgment" refers to requiring an acknowledgement solely and exclusively when it is expressly requested;
at least some of the restrictions may be provided to the device by the radio communication network;
it may comprise a memory unit specifically for storing at least some of the restrictions in advance;
at least some of the measurements may be transmitted to the device by at least some of the radio terminals over a backward channel dedicated to broadcast and not requiring systematic acknowledgment over the broadcast forward channel;
such measurements may, for example, be contained within measurement report data messages.

The invention further discloses a network device for a radio communication network, equipped with an adaptation device of the type described hereinabove. Such a network device may, for example, be an access gateway enabling access to a core network of the radio communication network.

Other characteristics and advantages of the invention shall become apparent upon examining the detailed description hereinunder, and the attached drawing, in which the sole FIGURE schematically and functionally depicts a part of a terrestrial broadcast network comprising an access gateway equipped with an example embodiment of an adaptation device according to the invention.

The drawing may serve not only to complete the invention, but also to contribute to defining it, if need be.

The object of the invention is to enable a radio access network of a radio communication network to adapt the schemes for modulating and coding data (potentially multimedia data) that must be broadcast to radio terminals over the broadcast forward channel, by means of a dedicated carrier, based on actual (or real) radio propagation conditions over links established between the radio network and its radio terminals (which are recipients of the data to be broadcast).

In what follows, it is assumed by way of a non-limiting example that the communication terminals are mobile (or cellular) telephones. However, the invention is not limited to this type of radio terminal. Rather, it pertains to any fixed or mobile (or portable or cellular) communication device capable of exchanging data in wave form with another device, via a radio access network. Consequently, they may also be fixed or mobile (or cellular) telephones, desktop or laptop computers, or personal digital assistants (or PDAs), equipped with radio communication means, which may potentially be satellite-based, capable of receiving the data that is broadcast.

Furthermore, it is assumed in what follows, by way of a non-limiting example, that the radio communication network is a terrestrial data (e.g. multimedia data) broadcast network. For example, the network is the evolution, known as LTE ("Long Term Evolution") of a cellular (or mobile) UMTS/MBMS ("Multimedia Broadcast/Multicast Services") network. However, it may also be a UMTS/DVB-H network, particularly adapted to broadcasting mobile television (or "mobile TV") programs, for example.

It should be noted that the invention is not limited solely to terrestrial radio data broadcast networks. It generally pertains to all types of networks with a radio access network capable of broadcasting data, and particularly satellite networks such as SDMB ("Satellite Digital Multimedia Broadcast") networks, or hybrid networks (i.e. both satellite-based and terrestrial).

As is depicted in the sole FIGURE, an LTE broadcast network may, schematically but nonetheless sufficiently for understanding the invention, be summarized as a core network CN coupled to a radio access network.

The radio access network of an LTE network mainly comprises base stations (called Node Bs) Ni and at least one access gateway AG connected to base stations Ni.

Each base station Ni is associated with at least one (logic) cell Ci covering a radio area (or coverage area) within which mobile (or cellular) radio communication terminals UE may establish (or follow) radio links, and within which this base station Ni may broadcast data, for example multimedia data (such as television programs, in particular).

In the example depicted, only three cells (C1-C3, i=1 to 3) have been depicted. However, the variable i may assume any non-zero value. Furthermore, in the example depicted, every base station Ni is assigned to a cell Ci. However, a base station may be assigned to multiple cells.

The access gateway AG is a centralized device that, in particular, handles the interface between the core network CN and the base stations Ni, in particular to provide them with the data to be broadcast.

The core network CN comprises network devices that, in some cases, are connected, in particular, to the access gateway AG. Among these devices, there may be cited at least one node handling the connection from the core network CN to a service network, which may be an IP network, that carries out the services made available to users of mobile terminals UE by the radio network's operator, and in particular data broadcast services.

Each base station Ni comprises an emission module EM and a reception module RM.

The emission module EM receives data to be broadcast using a selected modulation and coding scheme, and integrates them into the data frames that it broadcasts, in the form of radio signals by means of a dedicated carrier, over a forward channel (or "downlink") primarily dedicated to broadcasting.

The reception module RM is tasked with receiving the data frames transmitted by the mobile terminals UE over a backward channel (or "uplink"), and to convey them to the access gateway AG if necessary.

The forward and backward broadcast channels respectively correspond to first and second distinct frequency bands, or to distinct time slots or sets of time slots (for example, in TDD ("Time Division Duplex") transmission mode).

The mobile terminals UE are equipped with a communication module CM capable of both receiving data frames which are broadcast by the radio access network over the broadcast forward channel, and of transmitting data frames to the radio access network over the backward channel. The communication module CM is also capable of obtaining paging information and taking radio measurements regarding the radio reception conditions in its own cell and/or in other, neighboring cells and/or from other radio access technologies besides the one used by the broadcast service.

Certain mobile terminals UE, which are provided with a communication module CM that does not have enough parallel reception channels, are configured in such a way as to tune the reception part of their communication module CM successively over different carriers, including the carrier dedicated to broadcast over the forward channel. These successive tunings are done in cycles known as DRX ("Discontinuous Reception"), which are identical, or which vary from one radio terminal to another depending on their respective needs and/or their capacities and/or their identity (IMSI). Such a mobile terminal UE will therefore, for example, be able to receive the carrier dedicated to broadcasting over the broadcast forward channel for a first period D1, than receive the carrier used for transmitting paging indicators over one or more PCH downlink channels for a second period D2, then take radio measurements on one or more downlink channels during a third period D3 (in such a way as to estimate the quality of this/these downlink channel(s)), then to once again receive the carrier dedicated to broadcasting over the broadcast forward channel for a first period D1, and so on. The first D1, second D2, and third D3 periods collectively form a DRX cycle.

The invention proposes to install, within the radio network, an adaptation device D tasked with adapting (based on actual radio conditions) the modulation and coding schemes applied to the data that must be broadcast to certain mobile terminals UE over the broadcast forward channel, by means of a dedicated carrier. This scheme is known by the acronym MCS ("Modulation and Coding Scheme").

As is depicted in the sole FIGURE, by way of example, the adaptation device D may be installed in an access gateway AG. However, this is not mandatory. In reality, it may be installed in, or coupled to, another type of network device besides an access gateway, belonging to the radio access network. Installing it into the access gateway AG is advantageous because the gateway is particularly in charge of the centralized management of data modulation and coding within the radio access network.

According to the invention, the adaptation device comprises a processing module PM which is tasked with adapting at least one modulation and encoding scheme to be applied to data (to be broadcast by means of the dedicated carrier) based on actual (or real) radio propagation conditions, over links established between the radio network and mobile terminals UE (which are recipients of the data to be broadcast).

At least two embodiments may be foreseen for the device D.

In a first embodiment, the processing module PM determines the actual radio broadcast conditions based on measurements that are transmitted to it by at least some of the mobile terminals UE which are the recipients of the data to be broadcast. These measurements are then representative of the quality of one or more radio reception channels of the radio terminals which are the recipients of the data to be broadcast.

By way of example, at least some of the measurements are what a person skilled in the art calls radio reception channel quality indicators or CQI. These indicators particularly include the signal-to-noise ratio ($Ec/N_0$), RSCP ("Received Signal Channel Power"—power received over the allocated physical channel), and RSSI ("Received Signal Strength Indicator"—all of the energy of the signal received over the entire band).

The values of these CQI indicators are generally measured by mobile terminals UE so that the network can adapt the reception and/or transmission portions of their communication module CM. Some of them are also useful for the radio access network, in order to adapt its own reception and/or transmission channels.

These measurements are transmitted to the device D by the mobile terminals UE that carry them out. For this reason, it is advantageous that they use the backward channel dedicated to broadcast. In such a case, the measurements are transmitted without systematic acknowledgement over the broadcast forward channel (meaning that the device D (or the radio access network) is required to send an acknowledgment message when it receives them if and only if this is expressly requested).

In this first embodiment, the measurements may, for example, be transmitted in specific messages, or in messages of the same type as those used to notify the network of events within the mobile terminal UE. They may also be transmitted in messages of the same type as those used to transmit measurements to the network, such as measurement reports, which are particularly used in UMTS networks. Such reports are, for example, used to convey position measurements, determined by an application within the terminal UE based on location information (derived, for example, from a constellation of GPS or GALILEO satellites), or traffic volume or quality of service (QoS) measurements determined by an application within the terminal UE.

Furthermore, these messages may, for example, be transmitted to the device D through random access over the broadcast backward channel. In one variant corresponding to TDD transmission mode, certain time slots reserved for the broadcast backward channel may be used to transmit the messages containing the first restrictions.

As a reminder, a single mobile terminal UE can transmit multiple CQI indicators corresponding to different radio channels.

The measurements may be used in different manners. For example, the processing module PM may determine, among the measurements that it has access to, the one which is best (or, respectively, worst), then it adapts each data modulation and coding scheme based on this best (or, respectively, worst) measurement.

In one variant, the processing module PM may determine the mean value of the measurements of the same type which it has access to, then it adapts each data modulation and coding scheme based on this mean value. In this situation, the processing module PM may potentially begin by weighting each measurement based on at least one radio parameter, such as the power used by the mobile terminal UE to transmit it over a radio channel of the broadcast backward channel, before determining the mean value of the weighted measurements.

In a second embodiment, the processing module PM determines the actual radio broadcast conditions, based both on block error rate (or BLER) measurements transmitted by at least some of the mobile terminals UE (which are recipients of the data to be broadcast); and on restrictions to which at least some of these mobile terminals UE (which are recipients of the data to be broadcast) are subject, that are not dependent on radio broadcast conditions;

These restrictions are preferentially representative of the DRX cycles of the mobile terminals UE.

These restrictions are, for example, transmitted by the mobile terminals UE that are subject to them. For this reason, it is advantageous that they use the backward channel dedicated to broadcast. In such a situation, this transmission of restrictions is preferentially done without systematic acknowledgement over the broadcast backward channel. Furthermore, as with the first embodiment, the restrictions may, for example, be transmitted in specific messages, or in messages of the same type as the ones used to notify the network of events within the mobile terminal UE, or in messages of the same type as those used to transmit measurements to the network, such as measurement reports. Furthermore, these messages may, for example, be transmitted to the device D by random access over the broadcast backward channel. In one variant corresponding to TDD transmission mode, certain time slots reserved for the broadcast backward channel may be used to transmit the messages containing the first restrictions.

This transmission of restrictions (from mobile terminals UE to the device D) is particularly well-suited to situations in which the DRX cycles of certain mobile terminals UE are not known to the network, because they vary based on the needs of these mobile terminals UE. However, when the DRX cycles of mobile terminals UE are invariable, it is advantageous for it to be the radio network (for example, the core network CN) that provides the device D with the restrictions. It is also possible to envision a mixed operating mode in which the mobile terminals UE with variable DRX cycles transmit to the device D (over the broadcast backward channel) the definitions of their DRX cycles (or restrictions), while the definitions of the invariable DRX cycles (or restrictions) of other mobile terminals UE are provided to the device D by the radio network. It is also possible to equip the device D with a memory unit in which the definitions of the DRX cycles (or restrictions) of mobile terminals UE are stored in advance (at least the invariable ones).

As with the first embodiment, the block error rate or BLER measurements (the ratio between the number of data blocks received by the mobile terminal UE and the number of blocks transmitted by the radio network) may also be sent by the mobile terminal UE in measurement reports or in dedicated messages.

It should be noted that restrictions and (BLER) measurements may potentially be transmitted simultaneously by a mobile terminal UE within a single message, which may or may not be a dedicated one.

When the processing module PM has access to restrictions and BLER measurements, it may, for example, reconcile the corresponding restrictions and the BLER messages, before determining an adaptation.

For example, when the restrictions are DRX cycles, the processing module PM may correlate a (very) bad BLER measurement with a period of a DRX cycle during which a mobile terminal UE could not receive the broadcast service. In this situation, the processing module PM might not take the BLER measurement received into account, or it may correct it by weighting it before using it for the adaptation.

Generally speaking, the processing module PM uses restrictions to determine whether any measurements are aberrant, then to correct or discard the aberrant measurements. Next, it determines the adaptation to perform based on the remaining measurements (which may potentially have been corrected), which are unbiased and thus now representative of the actual radio conditions over the links established between the radio access network and the mobile terminals UE (which are recipients of the data to be broadcast).

When the processing module PM has access only to certain restrictions, such as certain DRX cycles (because they are not all available for all mobile terminals UE affected by a broadcast), it may for example determine its adaptations based on the most or least representative DRX cycle and/or on the DRX cycle which is associated with the highest quality of service (QoS), or on the DRX cycle where a mobile terminal is most often outside the range of reception.

The processing device D of the invention, and in particular its processing module PM, may be constructed in the form of electronic circuits, software (or computing) modules, or a combination of circuits and software.

In the example embodiments described above, the radio access network of the broadcast network is purely terrestrial. However, the invention also applies to purely satellite-based networks, as well as to hybrid networks comprising a satellite-based radio access network and a terrestrial radio access network, at least one of them being adapted for broadcasting data. It may thereby be envisioned that the broadcast forward channel is purely satellite-based (for example a satellite-adapted DVB-H channel) while the backward channel is purely terrestrial (for example UMTS), or vice versa.

The invention is not limited to the embodiments of the adaptation device and service equipment described in the foregoing, which are given only as an example; rather, it encompasses all variants that a person skilled in the art may envision within the framework of the claims set forth below.

The invention claimed is:

1. A device for adapting modulation and encoding schemes to be applied to data intended to be broadcast by way of a dedicated carrier over a so-called forward channel of a radio communication network to radio communication terminals connected to at least that radio communication network, comprising:

at least one processor configured to adapt at least one modulation and encoding scheme to be applied to data intended to be broadcast by way of said dedicated carrier, based on actual radio broadcast conditions between said radio communication network and radio terminals which are recipients of said data to be broadcast;

wherein said at least one processor is configured to determine said actual radio broadcast conditions based on measurements transmitted by at least some of said radio terminals which are recipients of said data to be broadcast, and representative of the quality of at least one radio reception channel of the radio terminals which are recipients of said data to be broadcast and wherein at least some of said measurements are radio reception channel quality indicators.

2. The device according to claim 1, wherein said at least one processor is configured to adapt each modulation and encoding scheme to be applied to data intended to be broadcast by way of said dedicated carrier, based on the worst radio reception channel quality indicator.

3. The device according to claim 1, wherein said at least one processor is configured to adapt each modulation and encoding scheme to be applied to data intended to be broadcast by way of said dedicated carrier, based on the best radio reception channel quality indicator.

4. The device according to claim 1, wherein said at least one processor is configured to adapt each modulation and encoding scheme to be applied to data intended to be broadcast by way of said dedicated carrier, based on a mean of the radio reception channel quality indicators.

5. The device according to claim 4, wherein said at least one processor is configured to weight the measurements involved in said mean, based on at least one radio parameter.

6. The device according to claim 1, wherein said measurements are transmitted to said device by at least some of said radio terminals over a backward channel dedicated to said broadcast and not requiring systematic acknowledgement over said forward channel.

7. The device according to claim 6, wherein said measurements are contained within so-called measurement report data messages.

8. The device according to claim 1 implemented in a network device for a radio communication network.

9. The device according to claim 8, wherein the device is part of a radio access network of said radio communication network.

10. The device according to claim 8, wherein the device constitutes an access gateway specifically for enabling access to a core network (CN) of said radio communication network.

11. A device for adapting modulation and encoding schemes to be applied to data intended to be broadcast by way of a dedicated carrier over a so-called forward channel of a radio communication network to radio communication terminals connected to at least that radio communication network, comprising:

at least one processor configured to adapt at least one modulation and encoding scheme to be applied to data intended to be broadcast by way of said dedicated carrier, based on actual radio broadcast conditions between said radio communication network and radio terminals which are recipients of said data to be broadcast;

wherein said at least one processor is configured to determine said actual radio broadcast conditions based on i) block error rate measurements transmitted by at least some of said radio terminals which are recipients of said data to be broadcast, and ii) restrictions to which at least some of these radio terminals, which are recipients of the data to be broadcast, are subject, that are not dependent on radio broadcast conditions.

12. The device according to claim 11, wherein said restrictions are representative of cycles during which said radio terminals are required to successively tune their reception to different carriers, including said dedicated carrier.

13. The device according to claim 12, wherein said cycles pertaining to said dedicated carrier and at least one other carrier selected from a group comprising a carrier used to transmit so-called paging information and a carrier used to take measurements representative of the quality of at least one radio reception channel of a radio terminal.

14. The device according to claim 11, wherein at least some of said restrictions are transmitted to said device by at least some of said radio terminals over a so-called backward channel dedicated to said broadcast, and not requiring systematic acknowledgement over said forward channel.

15. The device according to claim 11, wherein at least some of said restrictions are provided to said device by said radio communication network.

16. The device according to claim 11, comprising a memory unit specifically for storing at least some of the restrictions in advance.

17. The device according to claim 11, wherein said measurements are transmitted to said device by at least some of said radio terminals over a backward channel dedicated to said broadcast and not requiring systematic acknowledgement over said forward channel.

18. The device according to claim 11 implemented in a network device (AG) for a radio communication network.

* * * * *